United States Patent [19]

Chadwick

[11] 4,053,123

[45] Oct. 11, 1977

[54] METHOD AND APPARATUS TO DETERMINE NEED FOR ROTOR BLADE PITCH ADJUSTMENT AND/OR BLADE SUBSTITUTION

[75] Inventor: James R. Chadwick, Bradbury, Calif.

[73] Assignee: Chadwick-Helmuth Company, Inc., Monrovia, Calif.

[21] Appl. No.: 677,561

[22] Filed: Apr. 16, 1976

[51] Int. Cl.² ........................ B64C 27/72; G01M 1/22
[52] U.S. Cl. .................................. 244/17.11; 73/455; 244/17.25
[58] Field of Search .................. 73/455, 457, 463, 460, 73/462, 466, 467; 74/573, 574; 244/17.11, 17.13, 17.27; 46/31

[56] References Cited

U.S. PATENT DOCUMENTS

| 3,795,375 | 3/1974 | Lemnios | 244/17.27 |
|---|---|---|---|
| 3,802,273 | 4/1974 | Helmuth et al. | 73/455 |
| 3,945,256 | 3/1976 | Wilson et al. | 73/455 |
| 3,954,229 | 5/1976 | Wilson | 244/17.27 |

FOREIGN PATENT DOCUMENTS

| 573,962 | 4/1959 | Canada | 73/455 |

*Primary Examiner*—Trygve M. Blix
*Assistant Examiner*—Galen L. Barefoot
*Attorney, Agent, or Firm*—William W. Haefliger

[57] ABSTRACT

The output of an aircraft propulsion or lift rotor blade out-of-track pick-up is processed in such a way as to enable quick determination of need for blade pitch adjustment, the approximate amount of such adjustment to optimize reduction of out-of-track vibration, and the need for blade substitution when such optimized reduction is insufficient.

9 Claims, 17 Drawing Figures

METHOD AND APPARATUS TO DETERMINE NEED FOR ROTOR BLADE PITCH ADJUSTMENT AND/OR BLADE SUBSTITUTION

BACKGROUND OF THE INVENTION

This invention relates generally to balancing of rotors, and more particularly concerns method and apparatus for quickly and efficiently determining the need and extent of rotor blade pitch adjustment to alleviate an out-of-track condition, the need for blade substitution, and the amount of weight to be added to or subtracted from predetermined positions on the rotor to achieve dynamic balance. The invention is especially applicable to aircraft lift or propulsion rotors, as for example on helicopters and airplanes.

It is a well known fact that a slight out of balance condition of a helicopter main rotor or tail rotor can cause roughness and vibration leading to premature wear and failure of the machine, and fatique and annoyance of pilot and passengers. In the past, techniques used to correct out-of-balance in the field were crude, time consuming and inaccurate. For example, the mechanic would randomly add a weight to one of the several possible points of weight addition. The pilot and mechanic would hover the ship and try to judge whether the ship felt rougher or smoother; or the same. If rougher, the weight addition would be shifted to an opposite point; if then smoother, more weight would be tried (although it might really require less). If the same, another point would be tried. Generally, this would not lead to a smooth rotor, so weights would be added at another angular position, and the whole operation repeated. By repeating this procedure many times, vibration might be lessened, but the achievement of desired reduction was extremely unusual, because while the pilot could sense vibrational amplitude arising from rotor unbalance, he could not readily sense phase characteristics, and thus had no way of determining the locations for adding weights.

An important solution to the above problems, described in U.S. Pat. No. 3,802,273, concerns the provision of a helicopter main rotor and tail rotor dynamic balancing method on the ship, and apparatus characterized as enabling rapid and accurate balancing under field conditions. That method involves the attachment of an accelerometer to helicopter structure proximate the rotor (main or tail) subject to oscillatory motion induced by rotor dynamic unbalance; operating the accelerometer to produce an electrical signal which is processed to derive a corresponding amplified output signal; triggering a stroboscope in synchronism with cyclic variations in the output signal and directing the stroboscope at the rotor to produce flashes repeatedly illuminating a target rotor blade at a characteristic angularity with respect to its axis of rotation; and, varying the weighting of the rotor as a function of the magnitude of the output signal and the target blade characteristic angularity to achieve substantial balance. The varying step may include establishing a multi-coordinate system, either analog or digital, characterized in that a first coordinate scale delineates peak values of the output signal. A second coordinate scale delineates values of target blade angularity about its axis of rotation, and other coordinate scale means delineates weight valves to be added or subtracted to at least one predetermined position on the rotor, and further characterized in that any point in the system defined by particular coordinates on the first and second scales in turn defines particular weighting (on the other scale means) to be added or subtracted. Such first and second scales may define a polar coordinate system, and the other scale means may include two linear scales respectively associated with two sets of symmetric positions on the rotor, where weights are to be added or subtracted.

The method described in that patent contemplates preliminarily adjusting the rotor blades to accurately track one another during rotary travel; however, such prior adjustment may not always be possible, in practice, and in such event it is sometimes found that main rotor dynamic unbalance is affected by an out-of-track condition to an extent making satisfactory dynamic balance difficult to achieve. Further, main rotor blade out-of-track and out-of-balance conditions affect one another, i.e. interact, during flight, so that mixed, resultant vibrations are produced which are difficult to isolate and eliminate.

SUMMARY OF THE INVENTION

It is a major object of the present invention to provide method and apparatus enabling in-flight isolation of main rotor out-of-track vibration from out-of-balance vibrations, and vice versa, so that accurate tracking and counterbalancing may be achieved, under field conditions.

Basically, and with reference to out-of-track compensation, the method involves the use of pick-up means typically mounted forwardly or rearwardly of the rotor axis, and includes the steps:

a. rotating the rotor and operating the pick-up means to produce first vibratory signals corresponding to vibratory motion of the structure generally parallel to said axis, b. adjusting the effective pitch of at least one of said blades in an effort to reduce the amplitude of said vibratory signals, and c. repeating said a) and b) steps in an effort to further reduce the amplitude of said vibratory signals, said repetition being carried out to determine a minimum or near minimum value for said vibratory signal amplitude As will be seen, the pitch adjustment may be achieved by adjusting the effective length of at least one blade pitch link, or by blade trim tab adjustment; minimization of the vibratory signal amplitude (due to out-of-track) may be aided by use of a line of points method in a polar coordinate system as will be seen; and the method enables quick, in the field determination as to whether or not substitution of a blade or blades is required. Further, dynamic balancing of the blades themselves is facilitated as will be seen.

These and other objects and advantages of the invention, as well as the details of illustrative embodiments, will be more fully understood from the following description and drawings, in which:

DRAWING DESCRIPTION

DETAILED DESCRIPTION

Figure 1:
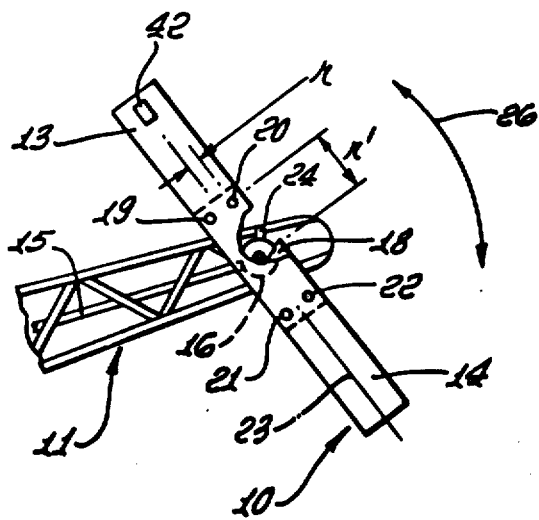
FIG. 1 is a side elevation of a helicopter tail rotor to be balanced.
Figure 2:
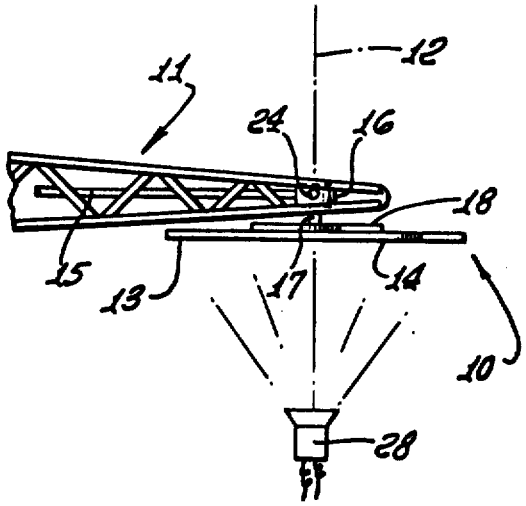
FIG. 2 is a top plan view of the FIG. 1 rotor.

In the drawings, a helicopter rotor may take the form of the tail rotor 10 in FIGS. 1 and 2 carried by helicopter boom structure 11, and defining an axis of rotation 12. The rotor 10 may typically have multiple like blades such as are indicated at 13 and 14 extending diametrically oppositely from axis 12. Power is transmitted to the rotor as for example by shaft 15, right angular gearing in gear box 16, and stub shaft 17 to which the blades are attached as via grips 18 by means of which the pitch of the blades may be changed. Suitable fastener locations are indicated at 19, 20, 21 and 22. Locations 19 and 22 are symmetrically located at opposite sides of axis 12, and locations 20 and 21 are symmetrically located at opposite sides of axis 12. Also, locations 19 and 20 are at opposite sides of blade axis 23, as are locations 21 and 22, and axis 23 extends normal to axis 12. It should be noted that the exact mechanical detail of blade attachment, pitch change means, etc. varies greatly from helicopter type-to-type, as do the number of blades. These mechanical considerations dictate the possible locations for weight addition.

As described in U.S. Pat. No. 3,802,273, a vibration pickup such as an accelerometer is attached to the helicopter structure proximate the rotor; and, in the example described an accelerometer 24 is shown attached to gear box 16. The instrument is operated to produce an output acceleration signal which is a function of oscillatory motion of the helicopter structure, as for example the boom structure 11, and which arises due to dynamic unbalance of the rotating rotor. Thus, the boom structure may undesirably vibrate in one or more directions. Depending on structure, the vibration (motion) may be elliptical, or even circular. While the accelerometer is shown as attached to the gear box, it will be understood that it may be attached to other structure, so long as such structure is subject to rotor unbalance induced oscillatory motion which is to be reduced or eliminated. While an accelerometer has been referred to any transducer producing a cyclic output signed in response to structure vibrations may be used.

The vibration pickup output is typically an electrical signal varying in accordance with the vibration, and therefore constitutes an output signal. That signal is typically processed to produce a corresponding output signal to be used to operate a meter or other device to indicate amplitude, and to display phase and for triggering a stroboscope shown at 28 in FIGS. 2 and 3. For that purpose processing circuitry may be electrically connected between the accelerometer or pickup 24 and the stroboscope, and may advantageously include a band pass filter 29 and a trigger 35, these individually being well known components. The filter 29 has the dual functions of passing the accelerometer signal corresponding to the structure oscillation frequency to be reduced or eliminated (usually the fundamental), while rejecting other signals corresponding to other excitation frequencies, and also integrating the selected or passed signal to thereby produce an output velocity signal on lead 32. Filter 29 may be manually tuned, as by rotating knob 33, to select the frequency of the structure vibration to be reduced or eliminated; further, the filter may be "stagger tuned" to provide a rather broad range of pass frequencies as indicated between the limits $f_1$ and $f_2$ of response curve 36 in FIG. 4 rather than a narrow range of pass frequencies as indicated by the response curve 37 in that figure. A meter 39 in FIG. 3 indicates accelerometer velocity, as for example in inches per second, which may represent the maximum velocity of the boom structure as it vibrates back and forth. In this regard, and as will be seen, an important advantage is converting the maximum accelerometer output to a maximum velocity signal (rather than acceleration or displacement) lies in the fact that whereas displacement and acceleration outputs for acceptable vibration levels vary widely (as a function of rate or frequency and as for example between helicopter main rotor and tail rotor applications), velocity outputs for acceptable vibrations vary much less widely, and use of the latter for balancing purposes enables use of the same instrumentation, without "range changing" for all such applications.

The stagger tuned vs single tuned filter characteristic is used to verify tuning, for when the "verify tune" button is depressed, the filter converts from its staggertuned characteristic to single tuned. If the rate is not set in exact coincidence with the rotor rate, the amplitude and/or observed phase will change. Tuning is adjusted as required (front panel control) until there is no change when the button is pushed.

Trigger circuit 35 operates in response to occurrence of positive going zero crossing of the velocity signal on lead 32, for cyclically triggering the stroboscope 28 to which the trigger circuit is connected as via lead 40. An example of a known usuable stroboscope STROBEX is Model 135M-7 or 135M-11, a product of Chadwick-Helmuth Co., Monrovia, Cal. The stroboscope is directed at the rotor, as in FIG. 2 for example, to produce flashes repeatedly illuminating a target blade (13 for example bearing target reflector 42) which appears relatively stationary at a "characteristic angularity" with respect to axis 12. This characteristic angularity is determined by the complex spring (of the supporting airframe) mass (of the rotor) system and the rotor rate. Each rotor of each helicopter type has a characteristic phase (or angularity) relation. Knowing such angularity, which may be expressed as "clock" position (blade 13 being shown at a 10:30 clock position in FIG. 1) and the magnitude of the maximum output velocity signal as it appears on meter 39, one may vary the weighting of the rotor to achieve substantial balance. In this regard, a small weight or weights may be added to or subtracted from the rotor at any of the fastener locations 19-22, the amount of such weighting change and the particular fastener locations at which the change is to be effected being determined by the reading on meter 39 and the clock position of the stroboscopically illuminated target blade. Accordingly, costly and time consuming trial and error weight change procedures are eliminated. Such weights may consist of washers to be added to or removed from threaded fasteners.

The determination of location and amount of rotor weighting may advantageously include the step of establishing a multi-coordinate system characterized in that:

a. a first coordinate scale delineates values of the velocity signal, b. a second coordinate scale delineates values of blade angularity (clock position) about its axis of rotation; and c. other coordinate scale means delineates weight values to be added or subtracted at at least one position on the rotor, and further characterized in that any point in the system or field defined by associated blade angle and velocity value coordinates in turn defines particular weighting to be added or subtracted at a position or positions on the rotor.

The referenced multi-coordinate system may be established in analog form (as for example graphic), tabular form, or in digital form (as for example in a digital computer memory). Thus, in FIG. 5 for example, a polar (analog) coordinate system is shown or established, with concentric circles delineating inches per second velocity values (0.1 to 1.0), and "clock" angles or positions (1 to 12) from a selected radius 42 delineate values of stroboscopically stopped target blade angularity. The referred to other coordinate scale means delineating weight values takes the form, in FIG. 5, of two linear auxiliary scales represented as A and B, and respectively corresponding to or associated with predetermined A and B weight adding or subtracting positions on the rotor blades 13 and 14 seen in FIG. 6.

Figure 6:
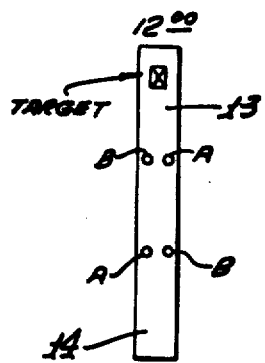
FIG. 6 is another representation of the FIG. 1 tail rotor blade.
Figure 7:
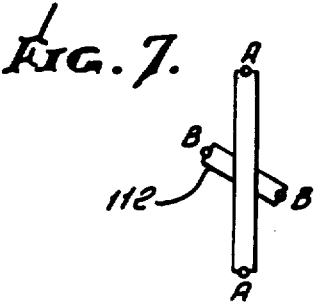
FIG. 7 is a representation of another tail rotor blade configuration.

Thus, for any point in the coordinate system defined by particular blade angle and velocity value coordinates, there is associated or defined particular weighting to be added or subtracted at the referenced position or positions on the rotor. For example point "P" representing a stroboscopically stopped blade angle or clock position 10:30 and velocity value 0.6 inches per second on meter 39 in turn defines (via intercept line 110) a 12 gram weight to be added to the target blade 13 at the B position shown in FIG. 6 (or alternatively a 12 gram weight to be subtracted from the blank blade 14 at the symmetrical B position shown), and also an 18 gram weight (via intercept line 111) to be subtracted from the target blade 13 and A position shown in FIG. 6 (or alternatively an 18 gram weight to be subtracted from the blank blade 14 at the symmetrical A position as shown). FIG. 7 illustrates another tail rotor configuration; with A positions at the blade tips, and B positions at the tips of a blade pitch control link 112 which rotates with the tail rotor, the chart for this configuration not being shown. In this regard, it should be noted that each rotor has certain locations, which will always be the same for that rotor type, at which weights may be added. The charts "reflect" the geometry of those possible points where weight may be added in relation to the rotor. Thus each rotor of each type of ship must have its own chart.

Using the above method, the helicopter tail rotor may be rapidly and accurately balanced with minimum cost and delay.

Figure 8:
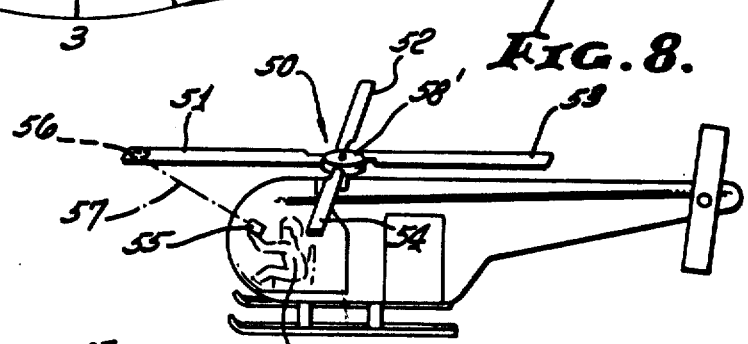
FIG. 8 is a perspective showing of a hovering helicopter to which the invention is applicable.

FIG. 8 illustrates balancing of a helicopter main rotor 50. Initially, the main rotor blades 51-54 are tracked to make sure that, as they rotate and pass through any given point in the azimuth, they are at the same level. Out-of-track condition causes roughness and vibration, affecting the balancing of the rotor unless removed prior to such balancing. Vibration and roughness arising from out-of-track conditions causes vertical and lateral vibration which masks the out-of-balance induced lateral vibration, making it impossible to distinguish the desired signal.

The condition of blade track is first observed with the ship operating as it will be during balancing, i.e. on the ground, or during hovering, as by aiming a stroboscopically operated light source 55 at the rotating blade tip path, the blade tip undersides carrying like retroreflective targets 56. The latter reflect light from the beam 57 back toward the observer 58 inside the helicopter, who sees the bright targets in the sky. The blades are typically identified by target shape or color and any misaligned blade can be identified and the degree of misalignment judged. Thereafter, after the helicopter is at rest on the ground, the offending blade can be trim-adjusted back into alignment, as by means commonly provided at the rotor head 58'.

The light source 55 may comprise, for example, a STROBEX Model 135 M-7 or M-11 product of Chadwick-Helmuth Co., Inc., Monrovia, Cal. Its sync signal may be derived from a magnetic pick-up 59 secured to a fixed swashplate 60 (better seen in FIG. 9), the pick-up projecting near a swashplate 61 rotated by main drive shaft 62. Swashplate 61 carries a number of components (one for each blade) such as soft iron elements 59a, which magnetically actuate the pick-up to produce the sync signal, once for each blade passage. The sync signal is used to control the stroboscopic lamp 55. Tilt controls for the fixed swashplate are shown at 65 and operated to control pivoting of the rotating blades via pitch control links 66, to provide flight direction control of the helicopter as well as lift control.

Figure 9:
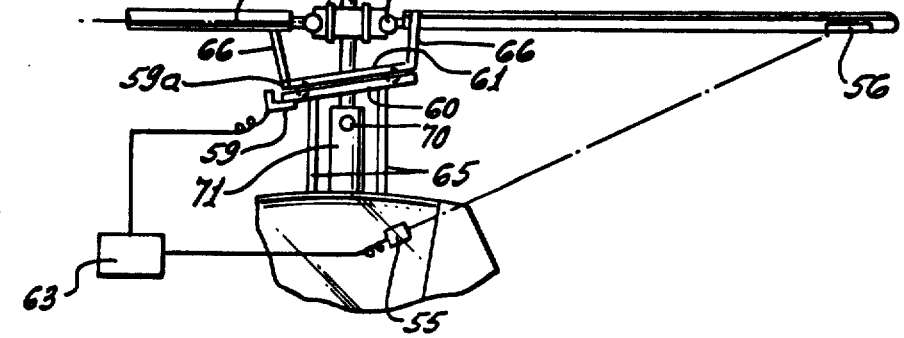
FIG. 9 is an fragmentary elevation showing a helicopter main rotor head.

As described in U.S. Pat. No. 3,802,263, dynamic balance of the main rotor may then be attained in a manner similar to that described above for the tail rotor. As shown in FIG. 9, an accelerometer 70 is attached to and near the top of the non-rotating mast 71 through which the main rotor drive shaft 62 passes, to detect lateral vibration of the mast arising from rotor dynamic unbalance. The accelerometer may be attached at a 9:00 O'clock position about the mast, 12:00 O'clock being forward. The accelerometer output is processed as in FIG. 3 to operate the stroboscope 28 which may be directed at the rotating rotor from the pilot's compartment in a manner similar to directing of stroboscope 55 in FIG. 8. The observed azimuth position at which the target is seen may jitter or be somewhat uncertain so it is advantageous to place the reflective target close to the blade roots, or on the hub. The target blade when illuminated may be located at any position about rotor main drive axis 73 depending upon the location of the imbalance.

Figure 11:
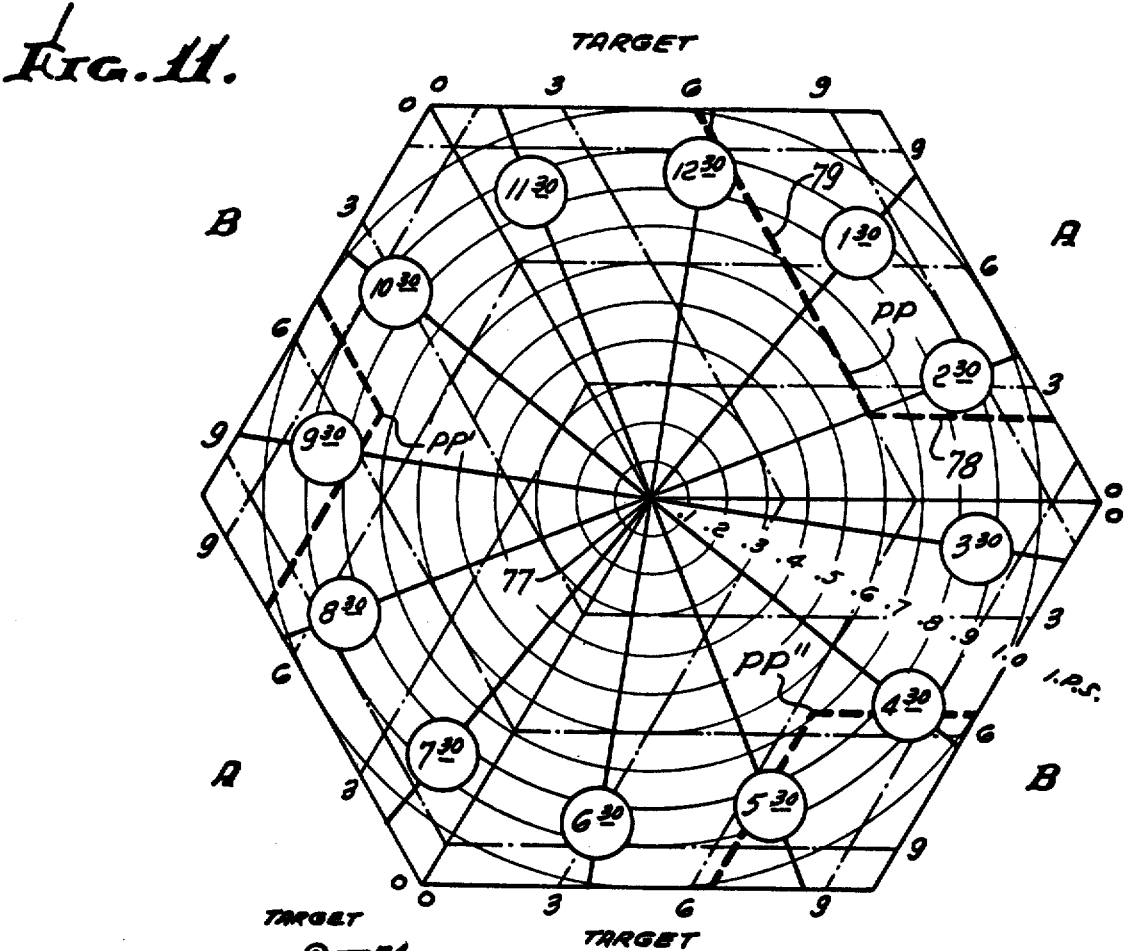
FIG. 11 is another coordinate system graph.
Figure 10:
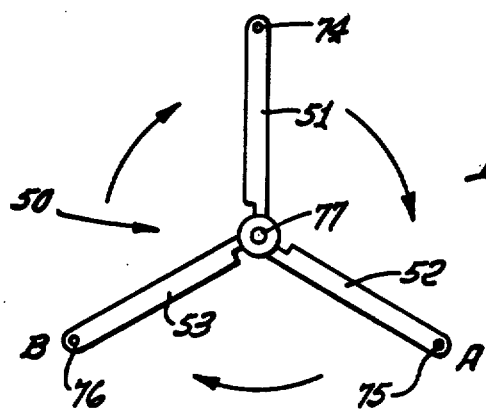
FIG. 10 is a plan view of a main rotor.

Assuming a main rotor 50 having three blades indicated as TARGET, A and B in FIG. 10, the latter may have fixed weight addition or subtraction positions indicated at 74-76. The determination of the amount of weight to be changed at any two of the three positions to overcome dynamic unbalance may be made with the aid of a multi-coordinate system as for example is shown in FIG. 11. As there seen, a first coordinate scale may be defined by concentric circles about center or pole 77, and identified by the i.p.s. (inches per second velocity output) number 0.1 to 1.0; and a second co-ordinate scale (delineating values of the angularity) is defined by the radial lines spaced apart at 30° intervals and identified by "clock positions" 12:30, 1:30-11:30. Other coordinate scale means delineating weight values to be added at at least two positions on the rotors are indicated at A, B and TARGET locations along hexagonal lines as shown.

In an example, assume a point PP representing a stroboscopically stopped target blade angle or "clock position" at 2:30, and also representing a velocity signal (derived from the accelerometer, as described) of about 0.6 inches per second. The two auxiliary scales applicable to this position are the A scale and TARGET scale at the top and top right of FIG. 11. As indicated, the corresponding intercept along line 78 on that A scale is approximately 2 weight values (grams, for example) to be added to the A blade at position 75, and the corresponding intercept along line 79 on that TARGET scale is approximately 5.8 weight values to be added to the TARGET blade at position 74, in FIG. 10. The intercept lines are parallel to the hexagonal scale lines A, B and TARGET in FIG. 11. Note that a point PP' would have intercepts on the A and B scales as shown, and that a point PP'' would have intercepts on the opposite TARGET and B scales, as shown. Also note that weights are to be added in every case, rather than subtracted.

Figure 3:
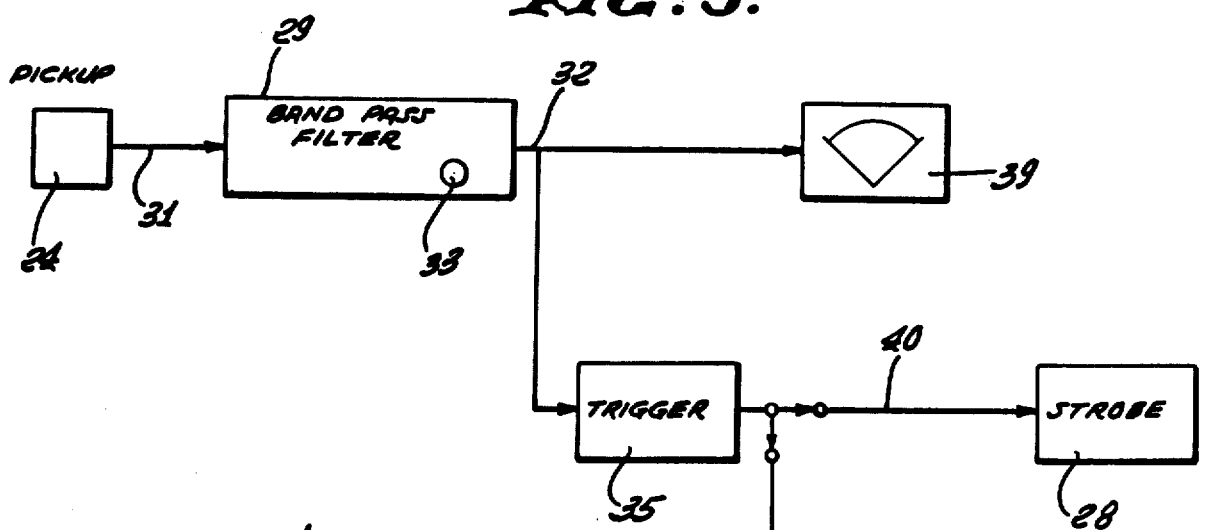
FIG. 3 is a block diagram of circuitry used in the balancing process.
Figure 4:
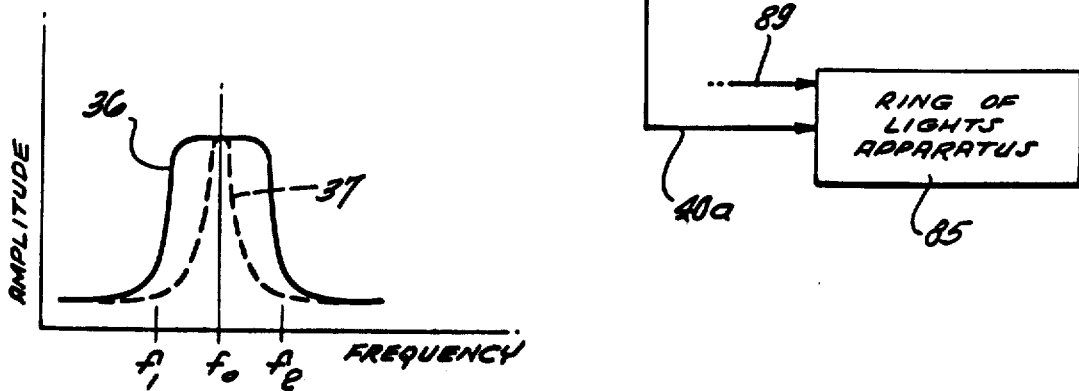
FIG. 4 is a frequency response diagram.
Figure 12:
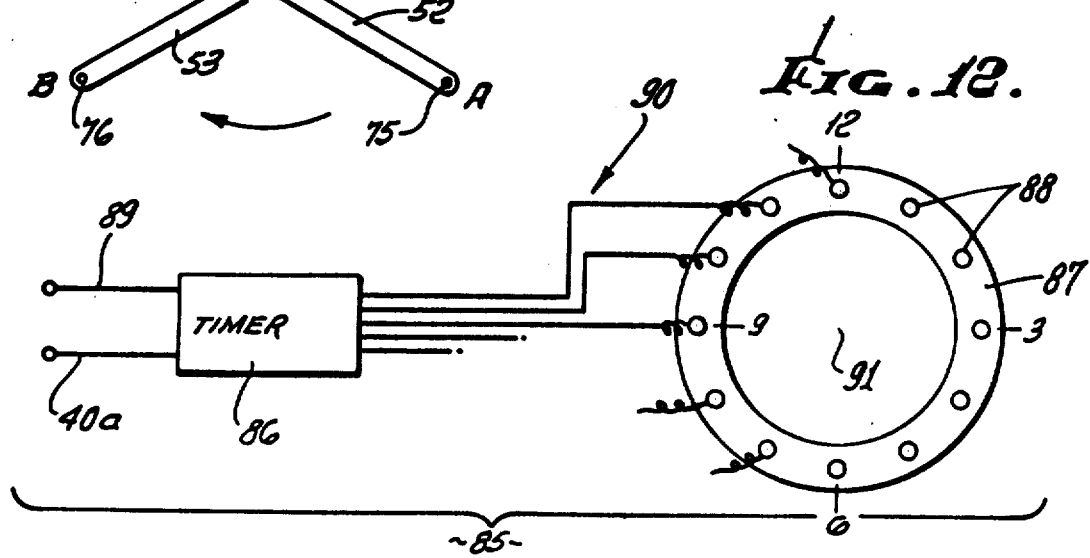
FIG. 12 is a light arrangement.

To obviate the difficulty of aiming the stroboscope 28 to the target blade in any position about axis 73, an auxiliary device 85 may be used as shown in FIG. 12. That device, such as Phazor Model 171, a product of Chadwick-Helmuth Co., Monrovia, Calif., may include a timer 86 and a ring 87 with lights or indicators 88 at equi-spaced angular intervals on the ring. The timer receives a sync signal once each revolution of the target blade 51, for example on line 89 to which the sync signal generator 59 may be connected. The timer is connected via leads 90 with all 12 (or other number) of lights 88 to turn them on in succession and in synchronism with the rotating "clock position" of the target blade; however, the timer also receives the trigger signal output on lead 40a as shown in FIG. 3. The timer only passes or gates an energizing signal to that light which is closest in synchronized position about axis 91 to the target blade position about axis 73 at the moment of trigger signal transmission. Accordingly, the operator may observe the angular clock position of the energized light or indicator, on the ring 87 in the pilot's compartment, and use the information as described above in the determination of blade weighting.

The compelling reason for the device 85 (the reason balance must be done in the air for some ships) is that the articulated (hinged) rotor systems have dampers (shock absorbers) in the lead-lag (azimuth) direction. Certain types of dampers have high static friction and don't allow the blade to adjust (by the effects of centrifugal force) to their desired equal spacing. If the ship is hovered, the necessary working of the controls, and loading of the blades "breaks" the static frictions and allows the blades to "phase" themselves properly. Thus balancing must be done from inside the ship where the device 85 is used.

The ship may be fitted with hardware to produce a sync signal for each blade passage to facilitate the blade tracking measurements. In this case, one of the sync signals (normally, the TARGET blade) is made a double pulse, and the device 85 includes logic to accept only the double pulse for the required one-per-rev. signal.

Because track and balance must be worked together, especially on main rotor, the instruments have been arranged to make this simple and quick to do. Tracking by the Strobex, as has been described, required one signal per blade from the magnetic pickup, but phase determination by the device 85 requires only one signal per revolution. Logic is incorporated in the device 85 that will response only to a "double pulse" with an interval of 0.5 to 5 millisecond, and will ignore all signal pulses. The Strobex, however, has logic such that it responds only to the first pulse.

Thus by installing, on the rotating swashplate, one double interrupter with interval suitable to generate the appropriate double pulse, and the required number ($n-1$ for $n$ blades) of single interrupters the signals (pulses) suitable for both track and balance are generated.

By simple front-panel selection then, either track or balance may be accomplished at will, making the operation very quick and simple.

Referring back to FIG. 9, each blade typically may have three axes of rotation designated as the pitch axis 95 extending generally parallel to the blade length, the articulation axis 95 extending generally parallel to the blade length, the articulation axis 96 extending generally horizontally and normal to axis 95, and vertical axis 97, suitable joints being provided to facilitate blade rotation about such axes.

Figure 13:
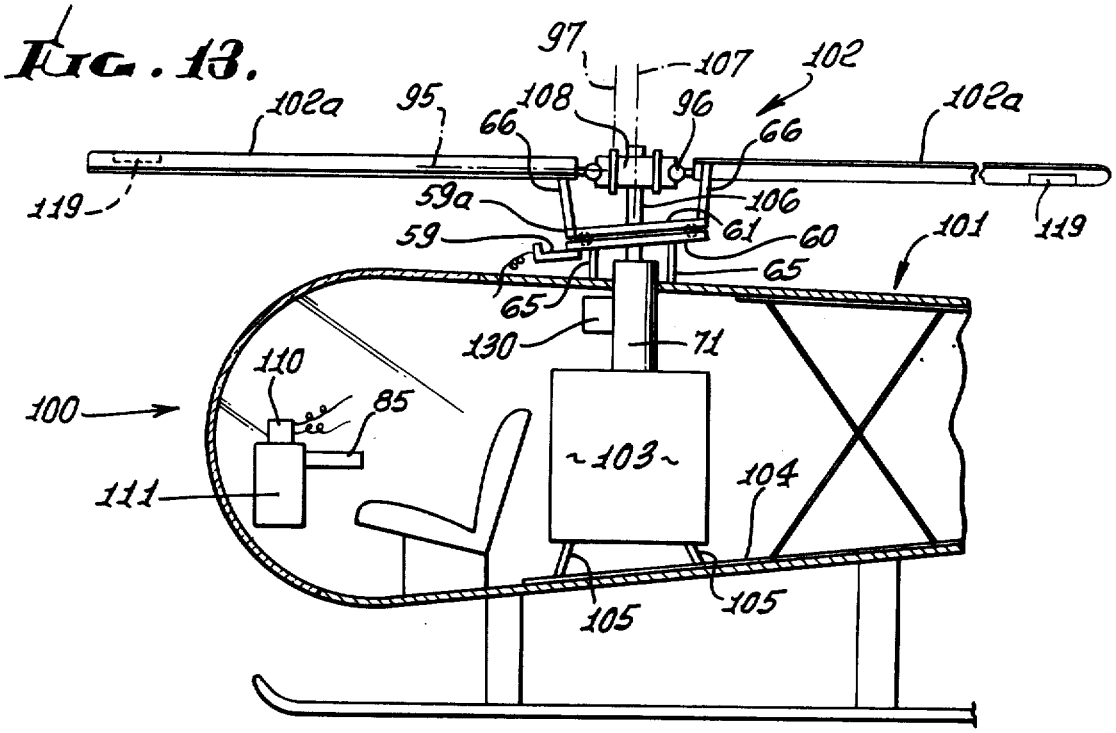
FIG. 13 is a vertical section through a helicopter proximate the main rotor, and looking laterally.

Referring now to FIG. 13, the helicopter 100 includes a fuselage 101, a main rotor 102 having two opposed blades 102a, an engine 103 suitably connected with the fuselage framework 104 as at 105, and an engine driven main drive shaft 106 for the rotor. The rotor axis appears at 107, and hub at 108, and elements 59, 59a, 60, 61, 65, 66, 71, 95, 96 and 97 appear as in FIG. 9.

In accordance with the invention, first vibration pick-up means is provided and oriented to detect vibratory motion of structure associated with the rotor and generally parallel to the rotor axis (as for example once-per-revolution vibration parallel to axis 107), and to produce corresponding vibratory signals. FIG. 13 shows one such pick-up 110 mounted forwardly of the rotor axis, as for example on instrument panel 111, and oriented to detect up and down motion. Accordingly, as the helicopter moves forwardly or rearwardly, any out-of-track of the blades will produce a once-per-revolution up and down vibration of the fuselage structure, that motion being advantageously amplified at the forward location of the pick-up, for detection by the latter.

The pick-up output signal or signals are employed to enable adjustment of the effective pitch of at least one of the blades, in an effort to reduce the amplitude of the vibratory signals; and such adjustment is repeated as necessary to further reduce the pick-up output signal amplitude, such repetition typically being carried out to determine a minimum or near minimum value for the once-per-revolution signal amplitude for a particular set of rotor blades.

Figure 14:
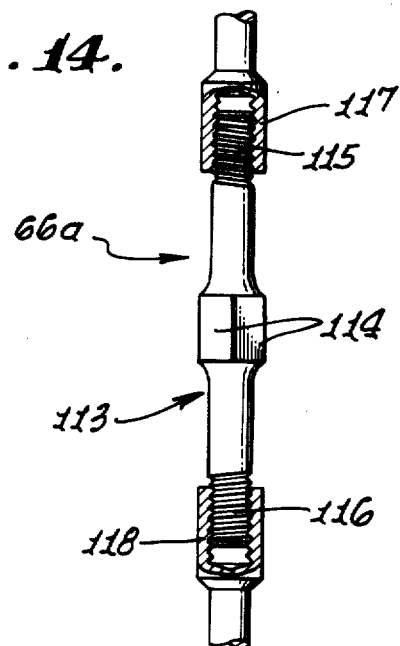
FIG. 14 is an elevation showing a blade pitch adjusting turn buckle.

Typically, the helicopter is set down, after the in-flight measurement of the vibratory output of pick-up 110, and the pitch adjustment effected by adjusting the effective length of at least one pitch link 66 connected to at least one blade. The link may include a turnbuckle as shown at 66a in FIG. 14, and having a pin member 113 with wrench engageable flats 114. When the latter is turned, the oppositely threaded pin ends 115 and 116 displace the box members 117 and 118 relatively toward or away from one another, depending on the direction of turning of the flats. An alternative method is to adjust a trim tab or tabs 119 on one or more blades, as seen in FIG. 13, to slightly increase or decrease the effective lift produced by the blade upon rotation.

Ultimately, if the minimum attainable value of vibratory output of the pick-up 110 is not acceptably small, it is recognized that a new blade should be substituted for the still excessively out-of-track blade, and this determination can quickly be made, at field locations, using the principles of the invention.

Figure 16:
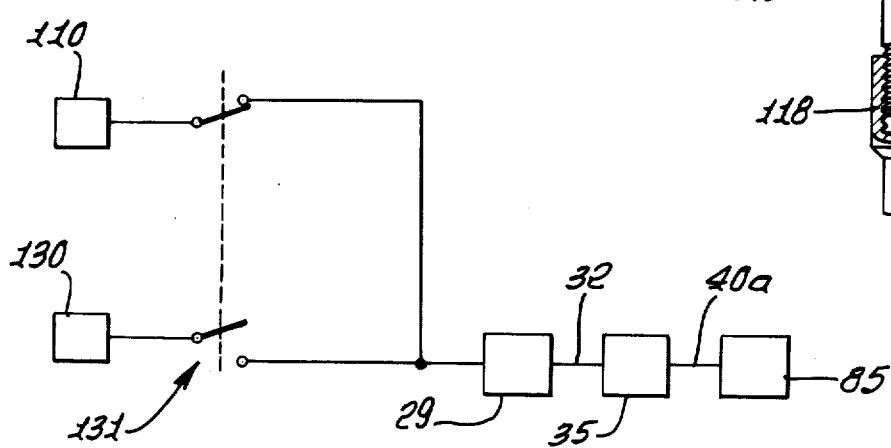
FIG. 16 is a circuit diagram.

In this regard, and referring to FIG. 16, the auxiliary device 85, as previously described, can be employed on the helicopter, during flight, to determine blade clock angle associated with the trigger signal on lead 40a, the trigger signal produced in response to the occurrence of positive going zero crossing of the velocity signal on lead 32.

Figure 5:
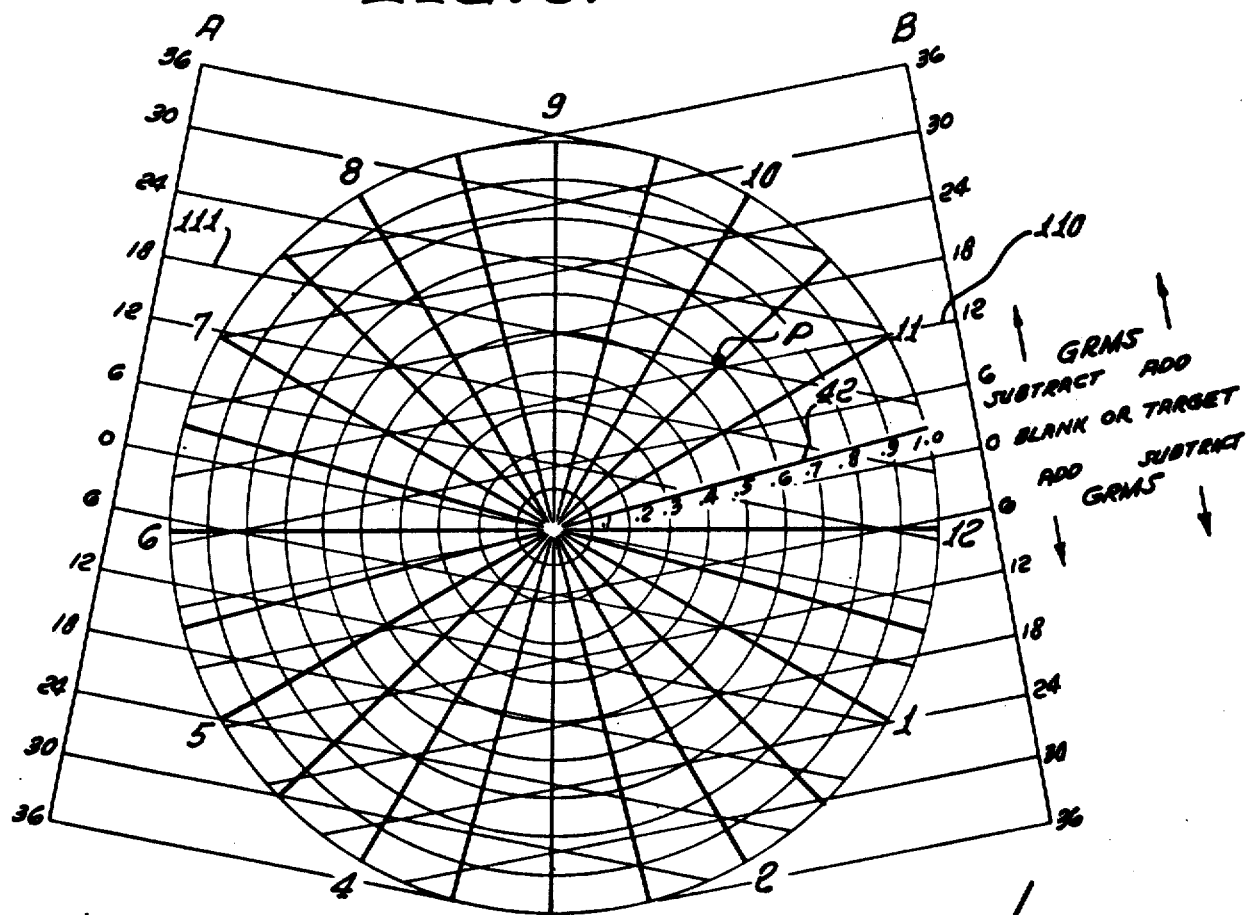
FIG. 5 is a coordinate system graph.
Figure 15:
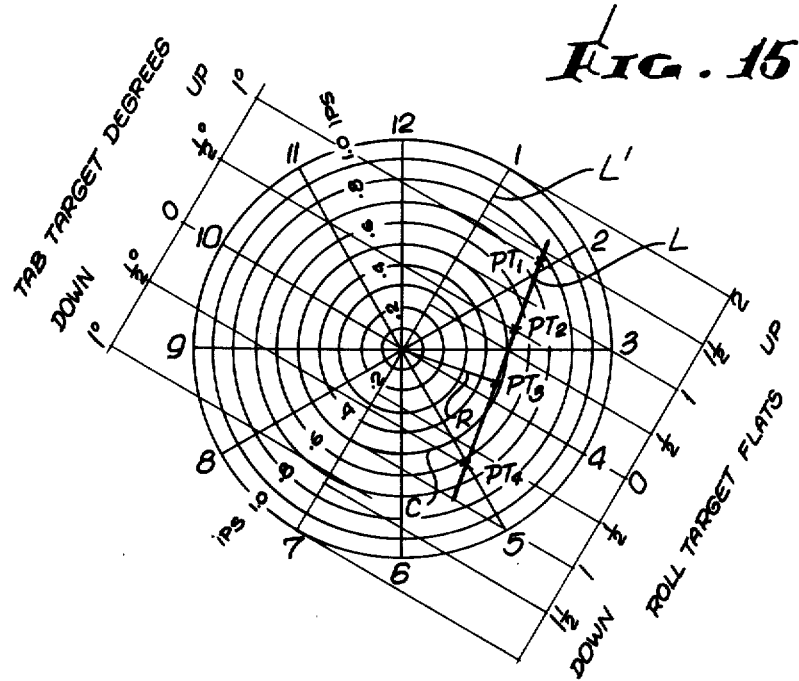
FIGS. 15 and 15a are co-ordinate system graphs.

Referring to FIG. 15, points $PT_1$, $PT_2$, $PT_3$ and $PT_4$ are shown in a polar coordinate field or graph characterized by clock angle and radial (signal velocity amplitude) dimensions in ips (inches per second), the graph being similar to FIG. 5. The graph is calibrated as shown in units (such as wrench flat turns, or trim tab degrees) corresponding to the amount of pitch adjustment required to minimize the pick-up output amplitude.

Figure 15A:
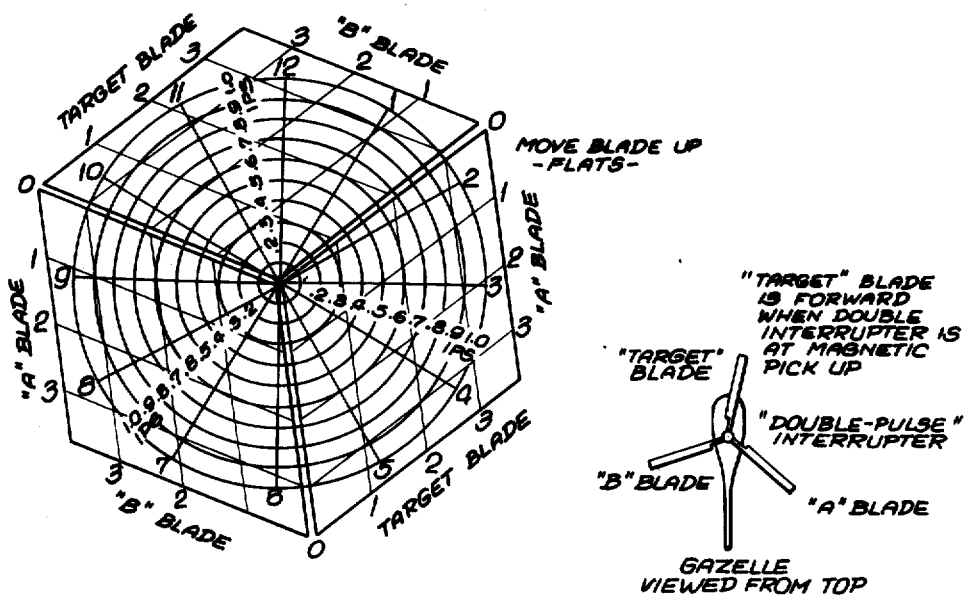

The four points $PT_1$–$PT_4$ having different ips values at different clock angles, are typical of the vibratory signal values and characteristic clock angles derived by the method described above (with repetitive adjustments in effective blade pitch angle), and they are found to define a line such as line L. The latter is shown as generally parallel to the one-o'clock-seven-o'clock line L' through the center of the graph, the center representing zero vibratory signal amplitude. The minimum spacing of the line L from the center is represented by radius R of a "best ride" circle C, the latter representing the minimum vibratory (out-of-track) signal amplitude characteristic of the particular rotor under test. In other words, optimization of the pitch adjustment of the blade or blades will produce a "ride" no better than that associated with the radius R of circle C; therefore, one can quickly determine, using the line of points method, whether or not a given set of rotor blades can be adjusted in effective pitch to produce an acceptably minimized out-of-track vibration, and if R is too great, a change in blade or blades or other rotor component is indicated or required. FIG. 15a shows a tracking chart for a three-bladed rotor.

A further refinement of the invention concerns the determination as to whether the pitch link or the trim tab should be adjusted in any particular case. For this purpose, a stroboscope may be directed at a target "+" on the underside of a blade tip, as in FIG. 8 (but with the stroboscope directed at the blade at one side of the fuselage) and the forward speed of the helicopter increased. If the horizontal bar "—" of the target appears to move upwardly on and above the vertical bar "|" in another blade as speed increases, trim tab adjustment is indicated; whereas, if the horizontal and vertical bars appear to rise together but remain in intersecting relation, then pitch link adjustment is indicated as needed.

FIG. 13 also shows the provision of a second vibration pick-up 130 mounted on the helicopter structure (as for example at the 12 o'clock position on mast 71) proximate the main lift rotor 102. Pick-up 130 is operated to produce second vibratory signals corresponding to vibratory motion of the helicopter structure about an axis generally normal to the rotor axis and extending forwardly and rearwardly relative to the helicopter. Such second signals are characteristic of a dynamic unbalance condition of the rotating rotor. Means is connected with the pick-up 130, as via switch unit 131 in FIG. 16, to receive and process the second signals to determine the characteristic clock angularity of one of the blades about axis 107 once each cycle of the signals. Such means is indicated at 29, 35 and 85 in FIG. 16, and corresponds to the same elements in FIGS. 3 and 12, for achieving balancing of the blades as previously described.

I claim:

1. In the method of testing a bladed rotor having multiple blades defining an axis of rotation, said rotor comprising a helicopter lift rotor and wherein helicopter structure associated with the rotor is subject to vibratory motion due to an out-of-track condition of the rotor blades, the method employing vibration pick-up means, the steps that include
   a. mounting the pick-up means on the helicopter structure with longitudinal spacing from the lift rotor,
   b. rotating the rotor and operating the pick-up means to produce first vibratory signals corresponding to vibratory motion of the structure generally parallel to said axis, said first signals having an associated amplitude and clock angle about said axis,
   c. adjusting the effective pitch of at least one of said blades in an effort to reduce the amplitude of said vibratory signals and maintaining the adjustment constant as the rotor rotates, and
   d. repeating at least said (b) step to produce second vibratory signals corresponding to vibratory motion of the structure generally parallel to said axis, said second signals having an associated amplitude and clock angle about said axis, and
   e. determining from said first and second signals amplitudes and from said clock angles a minimum or near minimum value for said vibratory signal amplitude, and which is less than each of said first and second signal amplitudes, and
   f. substituting a new blade or blades for at least one of said rotor blades if said minimum or near minimum value is unacceptably large, thereby to reduce said out-of-track condition of the rotor blades.

2. The method of claim 1 including repeating said (b) and (c) steps in an effort to still further reduce said minimum or near minimum value for said vibratory signal amplitude to an acceptable value.

3. The method of claim 1 wherein said pitch adjustment is effected by adjusting the effective length of at least one pitch link connected to at least one blade.

4. The method of claim 1 wherein said pitch adjustment is effected by adjusting the angularity of at least one trim tab associated with at least one of the blades.

5. The method of claim 1 wherein said vibratory signals are measured at associated blade clock angle positions about said axis, and said determination of said minimum or near minimum value is carried out by providing a polar coordinate field and deriving a line of points in said polar coordinate field characterized by clock angle and signal amplitude dimensions, each point representing a measured value of vibratory signal amplitude at a selected blade clock angle, said step (b) of claim 1 being carried out while the helicopter is in flight.

6. The method of claim 5 wherein said determining of said minimum or near-minimum amplitude value is further carried out by determining the minimum spacing of said line of points to the center of said polar coordinate field.

7. The method of claim 1 including the step of carrying out the claim 1 step (b) while the helicopter is in forward or rearward flight.

8. The method of claim 1 including the step of mounting a second vibration pick-up on the helicopter structure and operating said second pick-up to produce second vibratory signals corresponding to vibratory motion of the structure about an axis generally normal to said rotor axis and characteristic of a dynamic unbalance condition of the rotating rotor and using said second signals to alleviate said unbalance condition.

9. In the method of testing a bladed rotor having multiple blades defining an axis of rotation, and wherein structure associated with the rotor is subject to vibratory motion due to an out-of-track condition of the rotor blades, the method employing vibration pick-up means, carried by said structure, the steps including a. rotating the rotor and operating the pick-up means to produce first vibratory signals corresponding to vibratory motion of the structure generally parallel to said axis, b. adjusting the effective pitch of at least one of said blades in an effort to reduce the amplitude of said vibratory signals, and c. repeating said (a) and (b) steps in an effort to further reduce the amplitude of said vibratory signals, said repetition being carried out to determine a minimum or near minimum value for said vibratory signal amplitude, d. said rotor comprising a helicopter main lift rotor, and said pitch adjustment being effected by adjusting (i) the effective length of at least one pitch link connected to at least one blade, or (ii) the angularity of at least one trim tab associated with at least one blade, the selection of (i) or (ii) being determined by stroboscopically observing, for increasing forward speeds of the helicopter, the rate of rise of a cross bar target on the underside of a blade sweeping forwardly at one side of the rotor, adjustment (i) being indicated when the cross bar rises relative to a vertical bar target to another blade.

* * * * *